(12) United States Patent
Funamoto (10) Patent No.: US 7,705,832 B2
(45) Date of Patent: Apr. 27, 2010

(54) IMAGE DISPLAY APPARATUS, AND IMAGE DISPLAY METHOD

(75) Inventor: Kenji Funamoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 750 days.

(21) Appl. No.: 11/635,020

(22) Filed: Dec. 7, 2006

(65) Prior Publication Data

US 2007/0126715 A1 Jun. 7, 2007

(30) Foreign Application Priority Data

Dec. 7, 2005 (JP) ............... 2005-353452

(51) Int. Cl.
*G06F 3/041* (2006.01)
(52) U.S. Cl. ..................... 345/173; 396/287
(58) Field of Classification Search .............. 345/173
See application file for complete search history.

(56) References Cited

U.S. PATENT DOCUMENTS 7,034,881 B1 4/2006 Hyodo et al.

2004/0239621 A1* 12/2004 Numano ............... 345/156

FOREIGN PATENT DOCUMENTS

| JP | 5-244592 A | 9/1993 |
|---|---|---|
| JP | 11-164175 A | 6/1999 |

* cited by examiner

*Primary Examiner*—Richard Hjerpe
*Assistant Examiner*—Andrew Schnirel
(74) *Attorney, Agent, or Firm*—Sughrue Mion, PLLC (57) ABSTRACT

An image display apparatus that includes: a display screen having a touch panel function on which an image is displayed with operation buttons superimposed on the image, and a switching detection means for detecting a display switching operation for switching the display of the image from the display screen to an external device. When the display switching operation is detected by the switching detection means, the following is performed: the display of the image on the display screen is terminated and image data for displaying the image with the operation buttons superimposed on the image are outputted to the external device from the output terminal; the position information of a touched position on the display screen is detected; and one of the operation buttons displayed on the external device is selected according to the detected position information.

5 Claims, 11 Drawing Sheets

| SLIDE OPERATION | FUNCTION |
|---|---|
| FROM LEFT TO RIGHT | DISPLAY NEXT IMAGE |
| FROM RIGHT TO LEFT | DISPLAY PREVIOUS IMAGE |
| FROM TOP TO BOTTOM | ZOOM-IN THE DISPLAYED IMAGE |
| FROM BOTTOM TO TOP | ZOOM-OUT THE DISPLAYED IMAGE |
| FROM TOP RIGHT TO BOTTOM LEFT | ROTATE THE DISPLAYED IMAGE TO RIGHT BY 90 DEGREES |
| FROM TOP LEFT TO BOTTOM RIGHT | ROTATE THE DISPLAYED IMAGE TO LEFT BY 90 DEGREES |
| CIRCLE | DELETE THE DISPLAYED IMAGE |
| ⋮ | ⋮ |

IMAGE DISPLAY APPARATUS, AND IMAGE DISPLAY METHOD

BACKGROUND OF THE INVENTION

1. Field of the Invention

The present invention relates to an image display apparatus that includes a display screen having a touch panel function, and an image display method applied to the image display apparatus.

2. Description of the Related Art

Recently, the trend toward larger display screens has been in progress in electronic devices, such as digital cameras having display screens and the like, in order to improve their visibility of the images. On the other hand, reduction in the weight and size of the devices is also important. Consequently, development of such electronic devices as described, for example, in Japanese Unexamined Patent Publication Nos. 5(1993)-244592 and 11(1999)-164175, and U.S. Pat. No. 7,034,881 has been in progress. These electronic devices are equipped with a touch panel function on the display screen and the user operates the device in various ways through touch operation buttons displayed on the display screen, while minimizing the number of operation buttons, operation keys, and the like mounted thereon.

Most of the digital cameras and the like have an output terminal, and may output an image stored therein to an external device such as TV or the like by outputting image signals from the output terminal to the external device through a cable or the like. When a digital camera is connected to TV, it is customary that the display on the display screen of the digital camera is terminated to reduce the power consumption and to avoid complicated display control. Therefore, for the digital camera equipped with the touch panel function on the display screen and operated in various ways through touch operations as described above, the termination of the display on the display screen of the digital camera after it is connected to TV causes a problem that it lacks in operability since no operation button is displayed on the display screen.

SUMMARY OF THE INVENTION

The present invention has been developed in view of the circumstances described above, and it is an object of the present invention to improve the operability of an image display apparatus that includes a display screen having a touch panel function when the image is displayed on an external device.

In order to solve the problem described above, an image display apparatus of the present invention is an apparatus that includes:

a display screen having a touch panel function;

a display control means for performing control for displaying an image on the display screen with operation buttons superimposed thereon;

a position information detection means for detecting the position information of a touched position on the display screen;

a selection means for selecting one of the operation buttons displayed on the display screen based on the detected position information;

an image data generation means for generating image data for displaying the image on an external device with the operation buttons superimposed thereon; and an output terminal for outputting the generated image data to the external device, wherein:

the apparatus further includes a switching detection means for detecting a display switching operation for switching the display of the image from the display screen to the external device; and if the display switching operation is detected by the switching detection means:

the display control means terminates the display control of the display screen and outputs the generated image data to the external device from the output terminal;

the position information detection means detects the position information of a touched position on the display screen; and the selection means selects one of the operation buttons displayed on the external device according to the detected position information.

An image display method of the present invention is a method that includes the steps of:

displaying an image on a display screen having a touch panel function with operation buttons superimposed thereon;

detecting the position information of a touched position on the display screen;

selecting one of the operation buttons displayed on the display screen based on the detected position information;

generating image data for displaying the image on an external device with the operation buttons superimposed thereon; and outputting the generated image data to the external device from an output terminal, wherein:

the method further includes the step of detecting a display switching operation for switching the display of the image from the display screen to the external device; and if the display switching operation is detected, the display control of the display screen is terminated and the generated image data are outputted to the external device from the output terminal;

the position information of a touched position on the display screen is detected; and one of the operation buttons displayed on the external device is selected according to the detected position information.

The referent of "touch panel function" as used herein means a function, when a touch operation is performed on the touch panel, to output the information of the position on which the touch operation is performed.

The referent of "position information" as used herein means information for identifying the position on the touch panel on which a touch operation is performed (touched position), which may be, for example, a coordinate value, or the like. Further, the position information includes the movement direction of the touched position on the display screen (for example, when an operation of tap-in →dragging→tap-out is performed, it may be calculated from the information of the tapped-in position and the tapped-out position).

The display switching operation may be deemed to have been performed, for example, when the environment for sending/receiving image data is established between the output terminal of the image display apparatus and the external device, or the display switching operation may be performed by the user after the environment for sending/receiving image data is established between the output terminal of the image display apparatus and the external device.

Further, a configuration maybe adopted in which the apparatus further includes a performing means for performing functions, each corresponding to each of the operation buttons; and if a predetermined touch operation is performed while the display switching operation is detected by the switching detection means and one of the operation buttons is selected by the selection means, the performing means performs the function corresponding to the selected operation button.

Another image display apparatus of the present invention is an apparatus that includes:
  a display screen having a touch panel function;
  a display control means for performing control for displaying an image on the display screen with operation buttons superimposed thereon;
  a position information detection means for detecting the position information of a touched position on the display screen;
  an image data generation means for generating image data for displaying the image on an external device; and
  an output terminal for outputting the generated image data to the external device, wherein:
  the apparatus further includes:
    a switching detection means for detecting a display switching operation for switching the display of the image from the display screen to the external device;
    a movement direction/trace detection means for detecting the movement direction or the shape of the movement trace of the touched position from the position information detected by the position information detection means; and
    a performing means for performing a predetermined function according to the movement direction or the shape of the movement trace of the touched position on the display screen, and
  if the display switching operation is detected by the switching detection means:
    the display, control means terminates the display control of the display screen and outputs the generated image data to the external device from the output terminal;
    the movement direction/trace detection means detects the movement direction or the shape of the movement trace of a touched position on the display screen, and
    the performing means performs the function corresponding to the detected movement direction or the shape of the movement trace of the touched position.

Another image display method of the present invention is a method that includes the steps of:
  displaying an image on a display screen having a touch panel function with operation buttons superimposed thereon;
  detecting the position information of a touched position on the display screen; and
  generating image data for displaying the image on an external device; and
  outputting the generated image data to the external device from an output terminal, wherein:
  the method further includes the step of detecting a display switching operation for switching the display of the image from the display screen to the external device; and
  if the display switching operation is detected:
    the display control of the display screen is terminated and the generated image data are outputted to the external device from the output terminal;
    the movement direction or the shape of the movement trace of the touched position on the display screen is detected from the movement information of a touched position; and
    the function corresponding to the detected movement direction or the shape of the movement trace of the touched position is performed.

According to the present invention, an image display apparatus in which various functions are performed through a display screen having a touch panel function (touch panel display screen) is provided. In the apparatus, when a display switching operation is detected by the switching detection means, the display control of the display screen is terminated and one of the operation buttons displayed on the external device is selected by the touch operation on the touch panel display screen. Therefore, even if the display on the touch panel display screen is terminated when outputting the image to the external device, various functions may be performed using the touch panel while looking at the operation buttons displayed on the external device. Thus, the image display device employing the touch panel display screen for inputting operational instructions may select/perform various functions with minimized number of operation buttons mounted thereon for the reduction in size and weight thereof, while maintaining the operability when connected to an external device.

Further, adoption of the configuration, in which only the image is displayed on the external device when a display switching operation is detected by the switching detection means, and various functions are performed according to the movement direction or the movement trace of the touched position on the display screen having the touch panel function, may provide a clear view of the entire image displayed on the external device since the image is not interrupted by the display of the operation buttons.

DESCRIPTION OF THE PREFERRED EMBODIMENTS

Hereinafter, exemplary embodiments of the present invention will be described with reference to the accompanying drawings. In the following embodiments, description will be made of a case in which the image display apparatus of the present invention is applied to a digital camera. But the image display apparatus may also be applied to any other electronic device having a display, such as a cell phone, PDA, or the like.

First Embodiment

Figure 1:
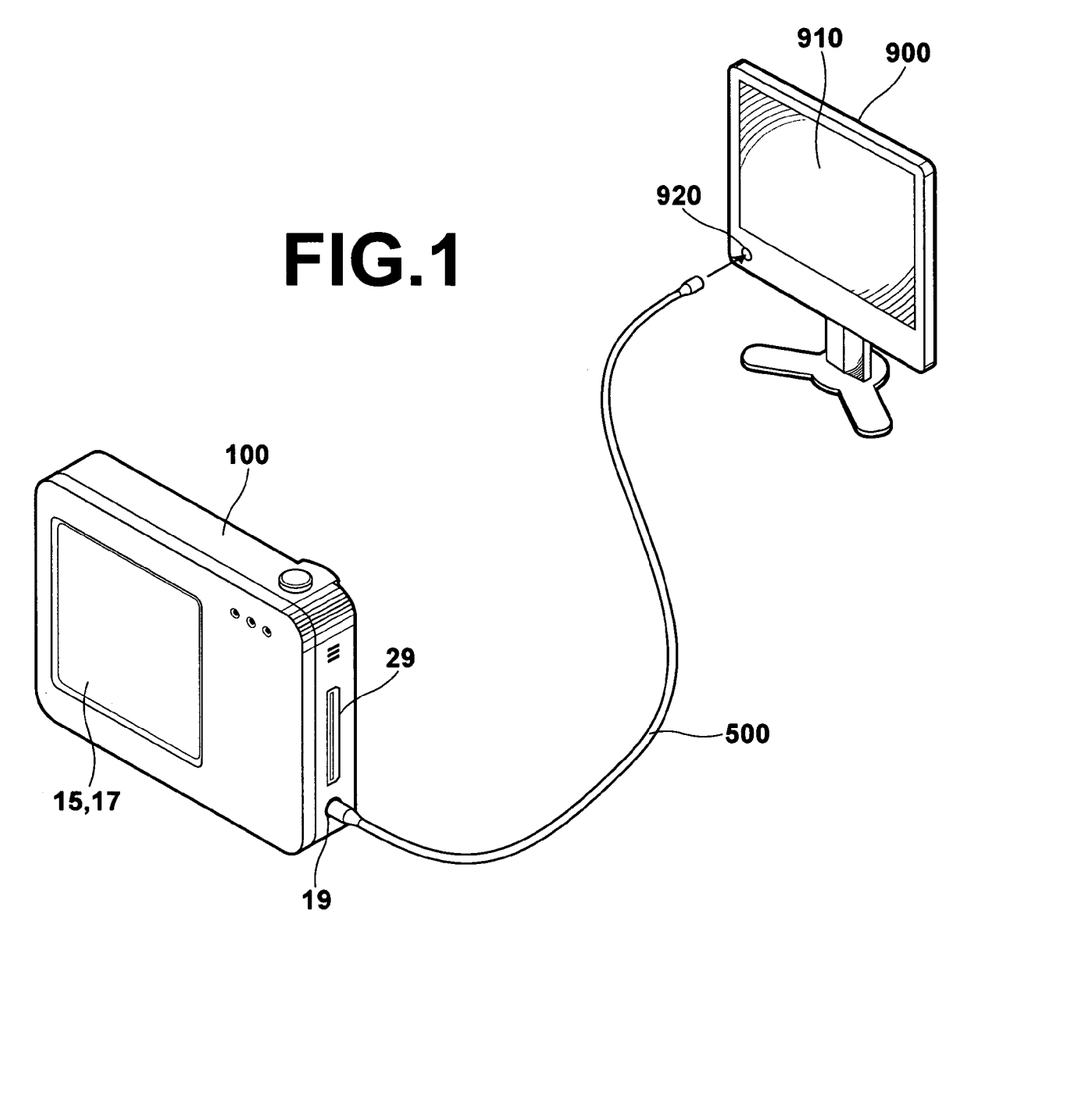
FIG. 1 is a drawing illustrating a rear perspective view of a digital camera and a front view of a display device.

FIG. 1 is a drawing illustrating a rear perspective view of a digital camera 100 to which the present invention is applied, and a front view of a display device 900. Although not shown, the digital camera 100 includes functional elements generally required for imaging on the front side thereof, such as a lens, a strobe, an auxiliary lamp, various sensors, and the like. It further includes on the rear and lateral sides thereof a monitor (display screen) 15, a touch panel 17, an output terminal 19, media slot 29, and the like. The monitor 15 displays an image recorded on a memory card inserted in the media slot 29, a menu screen required for performing various settings, or visual view of image data obtained by a CCD (not shown) at the time of imaging. In addition, it displays various operation buttons for selecting/performing various functions, such as for giving an instruction to switch the display from normal screen to menu screen, giving an instruction to perform switching between imaging mode and image reproduction mode, confirmation of a selected function, giving an instruction to perform the selected function, and the like. The touch panel 17 is disposed to cover the display surface of the monitor 15, and when one of the operation buttons displayed on the monitor 15 is depressed, a function corresponding to the operation button is performed.

The media slot 26 is an insertion slot for inserting a recording medium, such as a memory card, an IC memory, or the like. When a recording medium is inserted into the media slot 29, a data read/write operation is performed on the medium. The output terminal 19 is a terminal for outputting various data, including image data recorded on a memory card inserted into the media slot 29, image data recorded on a built-in memory of the digital camera 100, and the like.

The display device 900 is a TV display, a personal computer display, a projector, or the like, having an external input terminal 920. When one end of a cable 500 is connected to the output terminal 19 of the digital camera 100 and the other end is connected to the external input terminal 920, image data are outputted from the digital camera 100, and an image is displayed on a screen 910 based on the image data.

Figure 2:
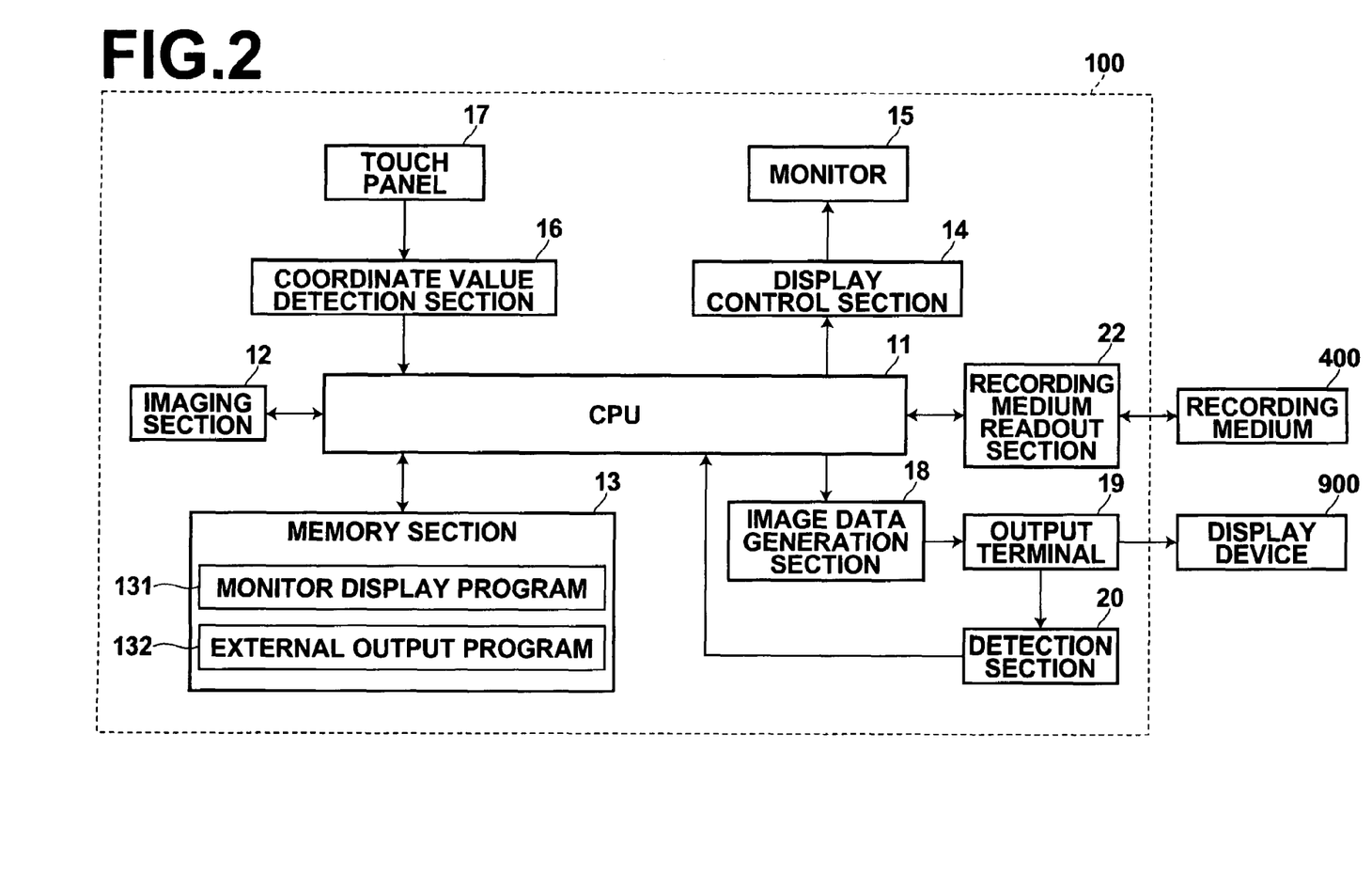
FIG. 2 is a block diagram of the digital camera according to a first embodiment.

FIG. 2 is a block diagram of the digital camera 100, illustrating the internal configuration thereof. The digital camera 100 includes: a CPU (selection means, performance means) 11; an imaging section 12; a memory section 13; a display control section (display control means) 14; the monitor 15, a coordinate value detection section (position information detection means) 16; the touch panel 17; an image data generation section (image data generation means) 18; the output terminal 19; a detection section (switching detection means) 20; and a recording medium readout section 22.

The CPU 11 performs overall control of the digital camera 100 by performing processes based on predetermined programs according to inputted instruction signals, and the like. More specifically, the CPU 11 performs a process based on a program read out from the memory section 13 according to the instruction signal inputted through the touch panel 17. Then, the CPU 11 outputs a display signal for displaying the processed result to the display control section 14 to cause the monitor 15 to display the image corresponding to the processed result. Further, The CPU 11 detects the movement direction of a touched position based on the coordinate value detected by the coordinate value detection section 16, to be described later, and outputs the instruction signal to cause the image data generation section 18 to generate image data for displaying the image corresponding the generated image data on the display device 900.

The imaging section 12 includes a lens and lens driver, a CCD and CCD driver, an A/D converter, and the like used for imaging, and performs imaging according to control signals outputted from the CPU 11.

The memory section 13 is a recording medium on which programs, data, and the like are prerecorded, which is a magnetic or optical recording medium, a semiconductor memory, or the like. The memory section 13 has stored thereon a monitor display program 131 for displaying an image on the monitor 15, an external output program 132 for outputting image data to an external device, such as the display device 900 or the like, as well as a system program (not shown) for operating the digital camera 100. The detail of the monitor display program 131 and the external output program 132 will be described later.

The display control section 14 controls the monitor 15 to causes it to display various display screens based on a display signal inputted from the CPU 11. The monitor 15 includes a CRT (cathode-lay tube), an LCD (liquid crystal display), an ELD (electronic luminescence display), or the like.

The touch panel 17 is disposed to cover the entire screen of the monitor 15. When the screen of the monitor is depressed by a finger of a person, an input pen, or the like, the coordinate value detection section 16 detects the coordinates of the depressed position on the screen, and outputs the coordinate value to the CPU 11. The CPU 11 performs the relevant process based on the type of the operation button displayed at the position corresponding to the coordinate value. In the present embodiment, the touched position on the monitor 15 is determined by the coordinate value, but any other alternative means may be used as long as it allows the determination of the touched position.

The user may perform a touch operation, such as a tap-in, a tap-out, sliding (dragging), or the like by abutting a finger thereof or an input pen on the monitor 15 (touch panel 17) at a predetermined pressure. The referent of "tap-in" as used herein means to abut a finger or an input pen to the monitor 15, and "tap-out" means to release the touched finger or input pen from the monitor 15. The referent of "sliding" means to slide a finger or an input pen on the monitor 15 with the finger or input pen being abutted thereon. Hereinafter, the operation in which a tap-in is performed, and thereafter a tap-out is performed without sliding is referred to as "single touch operation", and the operation in which the single touch operation is performed on the same position two or more times in series within a predetermined time is referred to as "double touch operation". Further, the operation of the touch panel 17 with a finger or an input pen including the tap-in, tap-out, sliding, and the like is correctively referred to as "touch operation", and the position on the monitor 15 to which a finger or an input pen is abutted is referred to as "touched position".

The detection section 20 outputs a detection signal to the CPU 11 when the output terminal 19 and the display device 900 is connected through the cable 500, or the like. When the detection signal is inputted to the CPU 11, it outputs the instruction signal to the image data generation section 18 to generate image data.

The image data generation section 18 generates image data for displaying the image on the display device 900 with the operation buttons superimposed thereon according to the instruction signal from the CPU 11. The generated image data are outputted to the display device 900 through the output terminal 19. Here, the image data may be generated based on image data recorded on a recording medium 400, or image data obtained by the imaging section 12.

The recording medium readout section 22 performs a data read/write operation on the recording medium 400, such as a memory card, an IC memory, or the like. The recording medium readout section 22 corresponds to the media slot 29 in FIG. 1.

Figure 3:
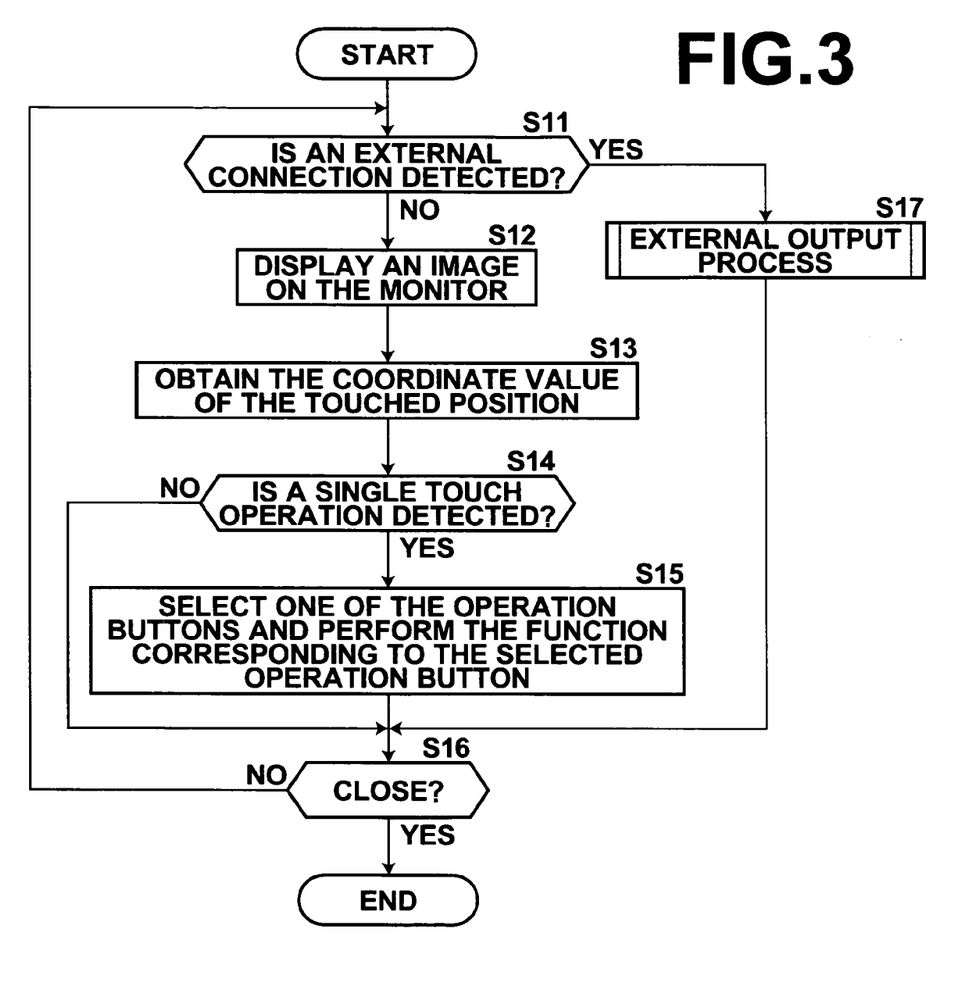
FIG. 3 is a flow chart illustrating a flow of a monitor display process according to the first embodiment.

Next, a flow of monitor display process will be described with reference to a flowchart shown in FIG. 3 and example screenshots shown in FIGS. 5A, 5B. The monitor display process is performed by the CPU 11 that operates according to the monitor display program 131. First, if the connection between the output terminal 19 and the display 900 is not detected (step S11 is negative), a display signal for displaying an image on the monitor 15 with operation buttons 81 superimposed thereon is outputted to the display control section 14 from the CPU 11. This causes the image to be displayed on the monitor 15 (step S12). Here, the image to be displayed may be an image based on image data recorded on the recording medium 400, or an image obtained by the imaging section 12.

Figure 5A:
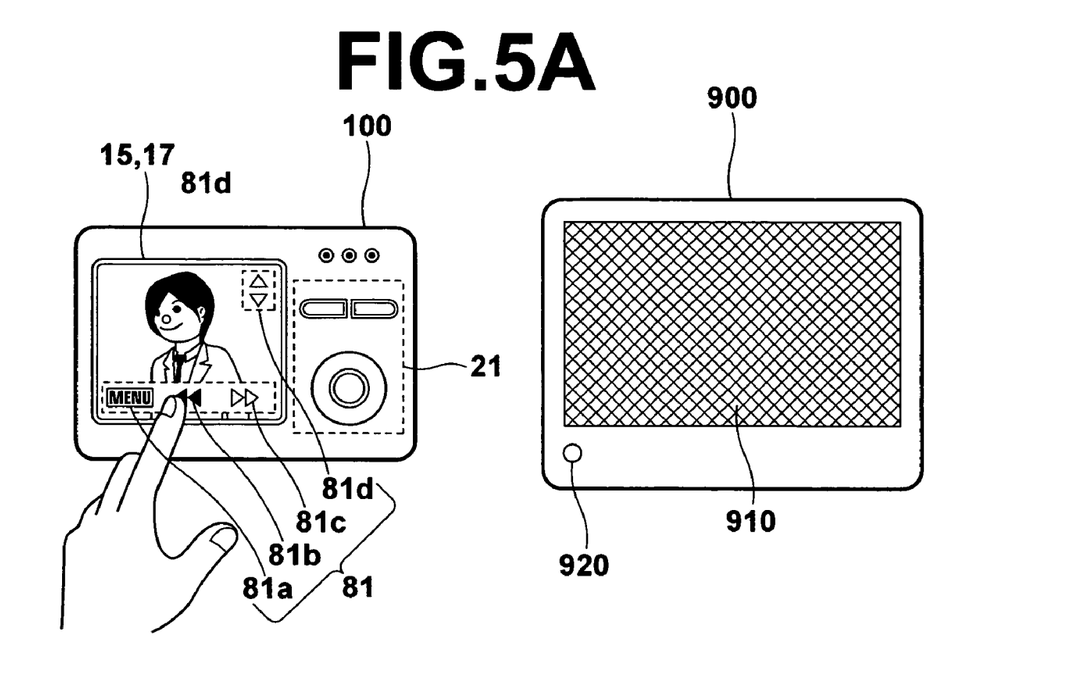
FIG. 5A is a drawing illustrating an example screenshot on the monitor according to the first embodiment.

An example screenshot of the monitor 15 at this time is shown in FIG. 5A. Here, the screen 910 is in a non-display status since the digital camera 100 is not connected to the display device 900. The operation buttons 81 displayed on the monitor 15 include, for example, a menu button 81a, a reverse button 81b, a forward button 81c, a zoom-in/zoom-out button 81d, and the like. Above are examples of the operation buttons 81 when the digital camera 100 is in image reproduction mode, and if it is in imaging mode, operation buttons required for imaging, including a shutter button, a subject position specifying button, and the like are displayed.

Then, when a touch operation is performed on the monitor 15, the coordinate value of the touched position is detected by the coordinate value detection section 17 and the coordinate value is outputted to the CPU 11 (step S14). The CPU 11 determines if the touch operation is a single touch operation. If the touch operation is determined not to be a single touch operation (step S14 is negative), the process moves to step S16. If the touch operation is determined to be a single touch operation (step S14 is positive), the CPU 11 performs the function corresponding to the operation button 81 displayed at the position on which the single touch operation is performed (step S15). For example, when a single touch operation is performed on the position where the reverse button 81b is displayed, the CPU 11 outputs a display signal to the display control section 14 to make the reverse button 81b identifiable to have been selected by, for example, changing the color or the shape of the reverse button 81b. Thereafter, the CPU 11 reads out, for example, the image data recorded immediately before the currently displayed image from the recording medium 400, and outputs a display signal to the display control section 14. Then, the image recorded immediately before the currently displayed image is displayed on the monitor 15 with the operation buttons 81 superimposed thereon.

Figure 4:
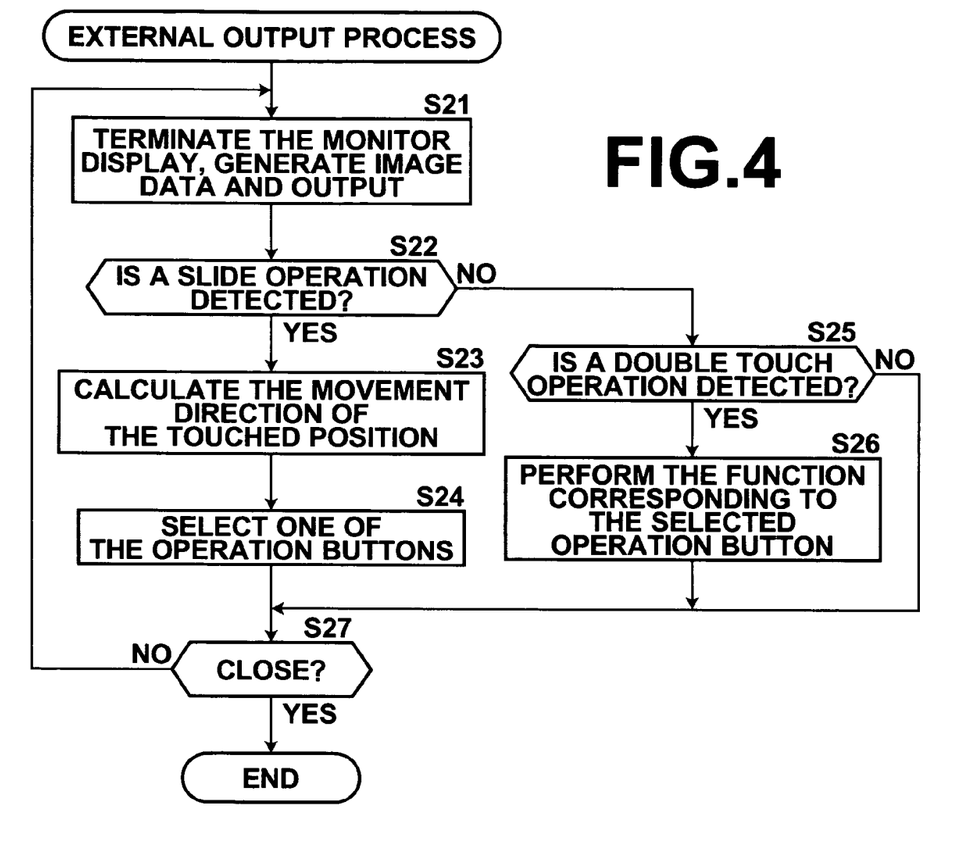
FIG. 4 is a flowchart illustrating a flow of an external output process according to the first embodiment.

In the mean time, if the connection between the digital camera 100 and the display device 900 is detected by the detection section 20 (step S11 is positive), the CPU 11 moves the process to an external output process (step S17). FIG. 4 is a flowchart illustrating a flow of the external output process, which is performed by the CPU 11 that operates according to the external output program 132. First, the CPU 11 outputs the instruction signal to the display control section 14 to terminate the display on the monitor 15, and causes the image data generation section 18 to generate image data for displaying the image on the display device 900 with the operation buttons 82 superimposed thereon. The generated image data are outputted to the output terminal 19, and then to the display device 900 (step S21).

Figure 5B:
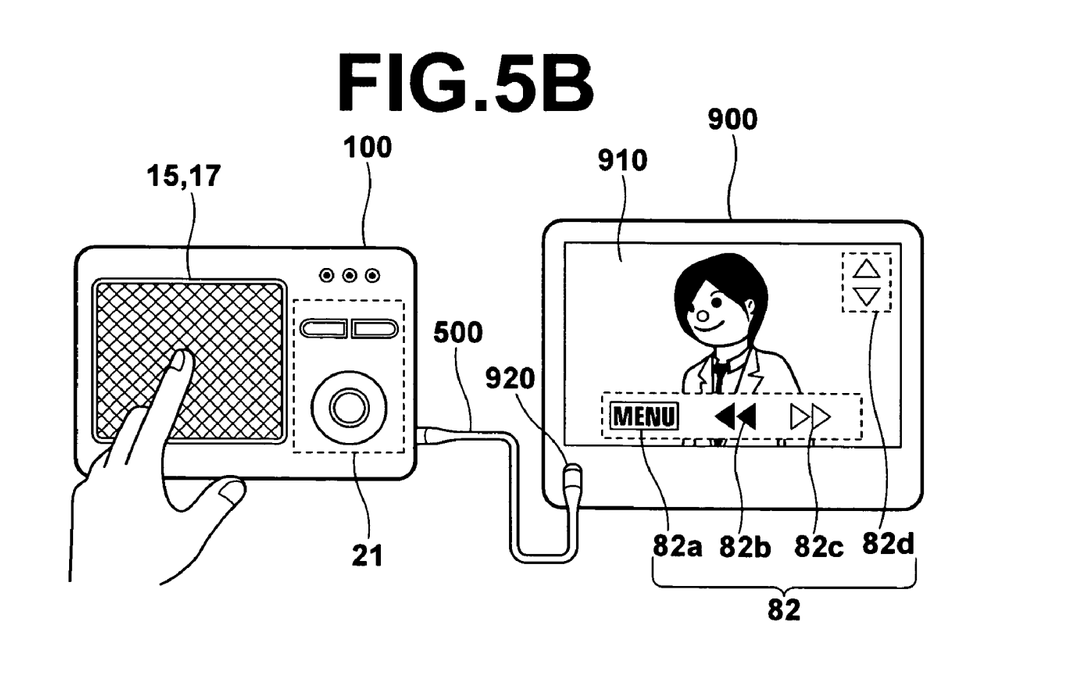
FIG. 5B is a drawing illustrating an example screenshot on the display device according to the first embodiment.

An example screenshot of the screen 910 of the display device 900 at this time is shown in FIG. 5B. The display device 900 displays the image and operation buttons 82 on the screen 910 based on the image data generated by the image data generation section 18. Then, a slide operation is performed on the touch panel 17 using a finger or an input pen, the selection status of the operation buttons 82 is changed based on the direction of the slide operation.

As described above, when the digital camera 100 is not connected to the display device 900 (FIG. 5A), if a single touch operation is performed on one of the operation buttons 81 displayed on the monitor 15 using a finger, an input pen, or the like, the coordinate value of the touched position is detected by the coordinate value detection section 16, and the function corresponding to the selected operation button 81 is performed by the CPU 11. On the other hand, while the digital camera 100 is connected to the display device 900, the display on the monitor 15 is terminated, and the function of the touch panel 17 is switched to act as a pointing device (touchpad) for selecting one of the operation buttons 82 displayed on the screen 910.

More specifically, while the digital camera 100 is connected to the display device 900, if, for example, an operation of tap-in, sliding, and tap-out is performed, the coordinate values of the positions where the tap-in and tap-out were performed are detected by the coordinate value detection section 16, and the coordinate values are outputted to the CPU 11. If the touch operation is a slide operation (step S22 is positive), the CPU 11 calculates the sliding direction (movement direction) of the touched position based on the coordinate values of the positions where the tap-in and tap-out were performed (step S23), and changes the selection status of the operation buttons 82 according to the sliding direction (step S24). That is, the selected operation button by the slide operation among the operation buttons 82 is displayed by changing the color, shape, Or the like. In FIG. 5B, the reverse button 82b is displayed in filled triangles, indicating that the reverse button 82b is selected.

In the description above, the sliding direction of the touched position is calculated based on the two coordinate values of the positions where the tap-in and tap-out are performed. Alternatively, the sliding direction may be calculated by sequentially detecting the coordinates of the touched positions while the slide operation is performed.

Thereafter, if a double touch operation is performed on the touchpanel 17 (step S25 is positive), the CPU 11 performs the function corresponding to the selected operation button 82(step S26). For example, if a double touch operation is performed while the reverse button 82b is selected, the CPU 11 reads out, for example, the image data recorded immediately before the currently displayed image from the recording medium 400 and outputs to the image data generation section 18. The image data generation section 18 generates image data for displaying the image on the screen 910 with the operation buttons 82 superimposed thereon based on the image data read out by the CPU 11.

As described above, when the digital camera 100 is used alone, one of the operation buttons 81 displayed on the monitor 15 is selected by performing a single touch operation on the monitor 15, and the function corresponding to the selected operation button 81 is performed. If the digital camera 100 is connected to the display device 900, the image display is switched to the display device 900 from the monitor 15, and the selection status of the operation buttons 82 displayed on the screen 910 is changed by a slide operation on the monitor 15. Then the instruction to perform the function corresponding to the selected operation button 82 is given by performing a double touch operation. Therefore, the digital camera, in which various functions are performed through the touch panel, and the monitor display thereof is terminated when outputting the image to an external device, may perform various functions using the touch panel while looking at the operation buttons displayed on the external device. Thus, the digital camera employing the touch panel for inputting operational instructions may select/perform various functions with minimized number of operation buttons mounted thereon for the reduction in size and weight thereof, while maintaining the operability when connected to an external device.

The embodiment described above may be changed or altered as appropriate without departing from the spirit and scope of the present invention. For example, in the embodiment, the digital camera 100 is electrically connected to the display device 900 through the cable 500. Alternatively, the image data may be transmitted from the digital camera 100 to the display device 900 by wireless communication, such as infrared communication, or the like. This may be realized by providing infrared ports for transmitting/receiving infrared rays instead of the output terminal 19 and the external input terminal 920.

Further, in the embodiment described above, the display of the monitor 15 is terminated and the image display is switched to the display device 900 when the connection between the output terminal 19 and the external input terminal 920 of the display device 900 is detected by the detection section 20. Alternatively, a configuration may be adopted in which the user performs the switching operation of the image display between the monitor 15 and the display device 900 through an operation button displayed on the monitor 15 or an operation key mounted on the digital camera 100, after the digital camera 100 is connected to the display device 900. In this case, the CPU 11 may determine the switching operation performed by the user based on the coordinate value detected by the coordinate value detection section 16 or a signal of the operation key, and perform the image display switching control.

Second Embodiment

Hereinafter, a second embodiment will be described. In the second embodiment, elements identical to those used in the first embodiment are given the same reference numerals and will not be elaborated upon further here.

Figure 6:
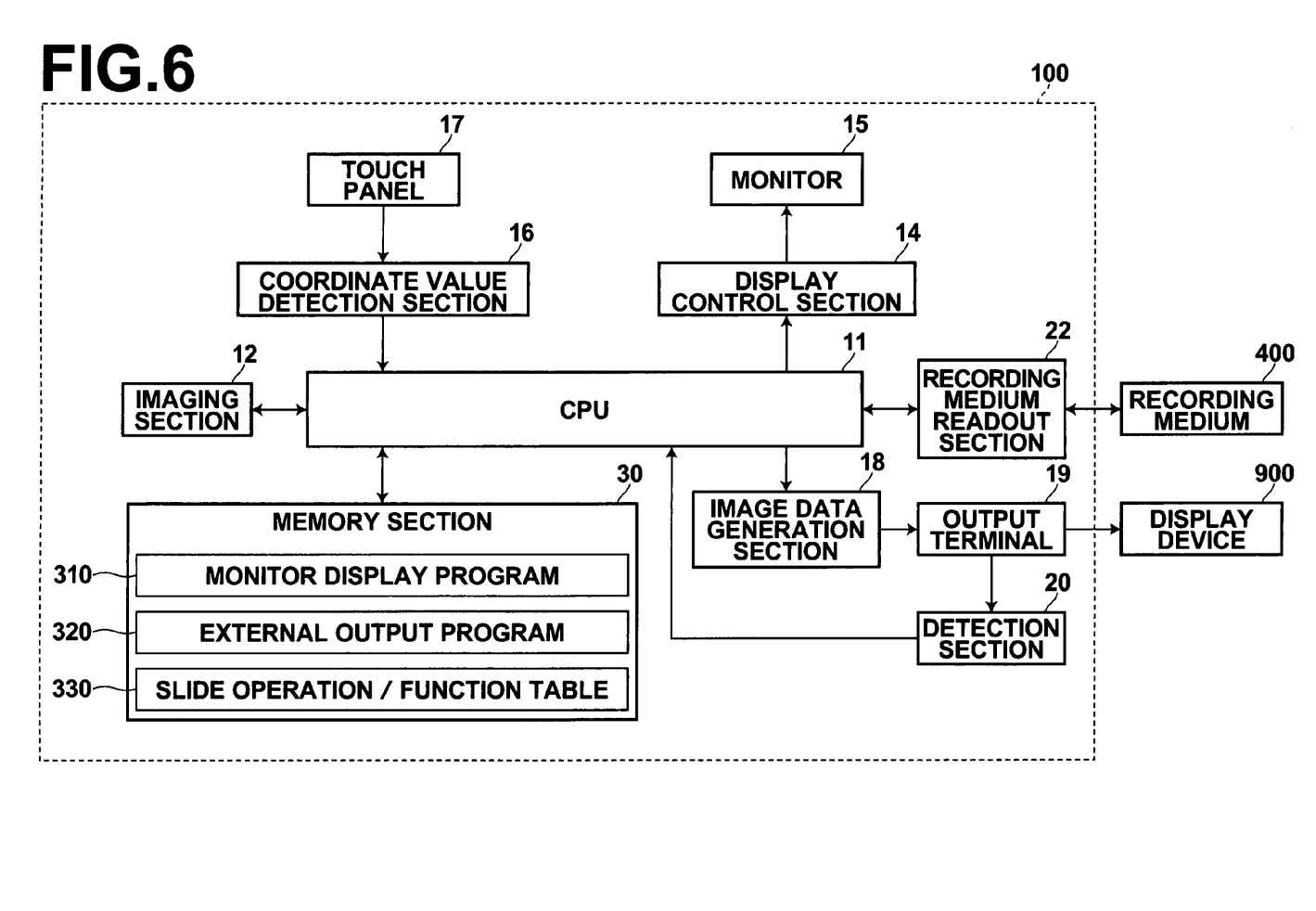
FIG. 6 is a block diagram of the digital camera according to a second embodiment.

FIG. 6 is a block diagram of a digital camera 100a according to the second embodiment, illustrating the internal configuration thereof. The digital camera 100a includes: the CPU 11; the imaging section 12; a memory section 30; the display control section 14; the monitor 15; the coordinate value detection section 16; the touch panel 17; the image data generation section 18; the output terminal 19; the detection section 20; and the recording medium readout section 22.

The memory section 30 has stored thereon a monitor display program 310 for displaying an image on the monitor 15, an external output program 320 for outputting image data to an external device, such as the display device 900, a slide operation/function table 330 in which types of slide operations and functions to be performed are recorded in a cross-referenced manner, as well as a system program (not shown) for operating the digital camera 100a.

In the first embodiment, when the digital camera 100 is connected to the display device 900, the image is displayed on the screen 910 of the display device 900 with the operation buttons 82 superimposed thereon. The superimposed display of the image and the operation buttons 82, however, causes a problem that it is difficult to get a clear view of the entire image due to interruption by the operation buttons 82. Consequently, in the present embodiment, a configuration is adopted in which only the image is displayed on the screen 910, and various functions are performed according to the direction of a slide operation, movement trace of a touched position, or the like when the digital camera is connected to the display device 900. This allows the user to perform various operations even if the operation buttons are not displayed on the screen 910.

Figure 7:
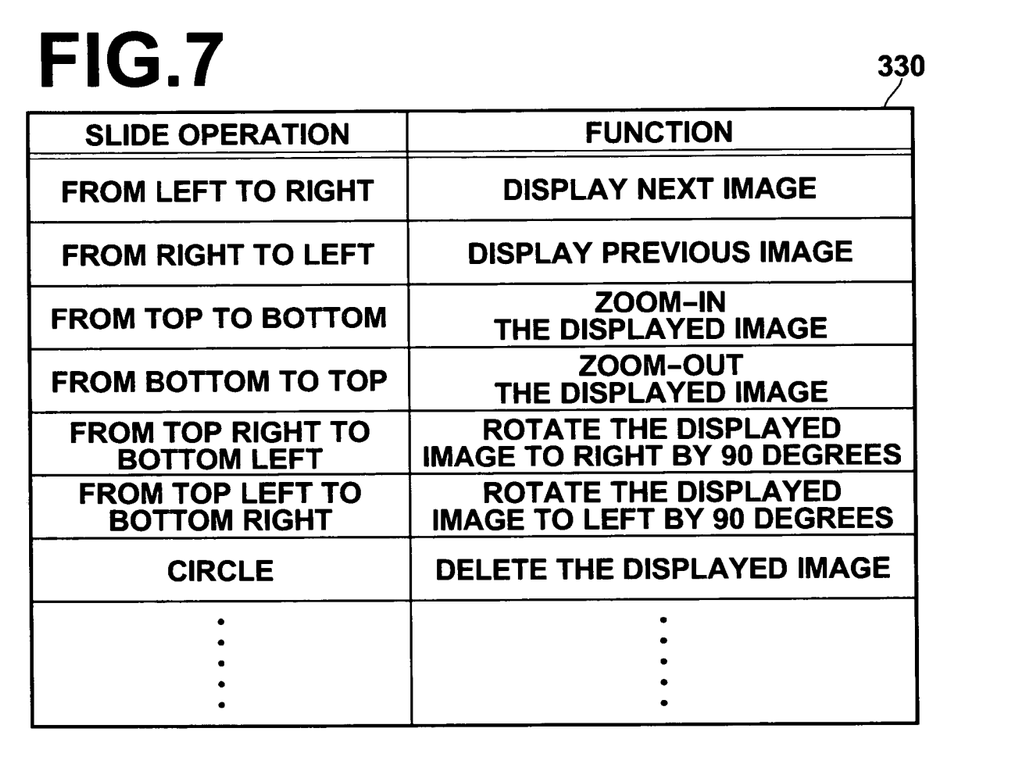
FIG. 7 is a drawing illustrating a data structure of a slide operation/function table according to the second embodiment.

FIG. 7 is a drawing illustrating an example data structure of the slide operation/function table 330. The types of functions are recorded in cross-reference with the types of slide operations in the slide operation/function table 330. The slide operation/function table 330 has recorded therein the types of functions in cross-reference with the types of slide operations, for example, like the following: if a slide operation is performed from left to right on the touch panel 17 using a finger or an input pen, the image display is switched and a subsequent image is displayed (forwarding), if a slide operation is performed from top to bottom, the currently displayed image is zoomed in, and if a slide operation depicts a trace of circle, the currently displayed image is deleted, and the like. Here, a configuration may be adopted in which the types of functions are prerecorded in cross-reference with the types of slide operations, or the types of slide operations and the corresponding types of functions are set arbitrarily in the slide operation/function table 330 by the user.

In the present embodiment, the slide operation/function table 330 includes both the movement direction and movement trace as the type of slide operation, but it does not necessarily include the both, and only either of them may be entered in the table.

Figure 8:
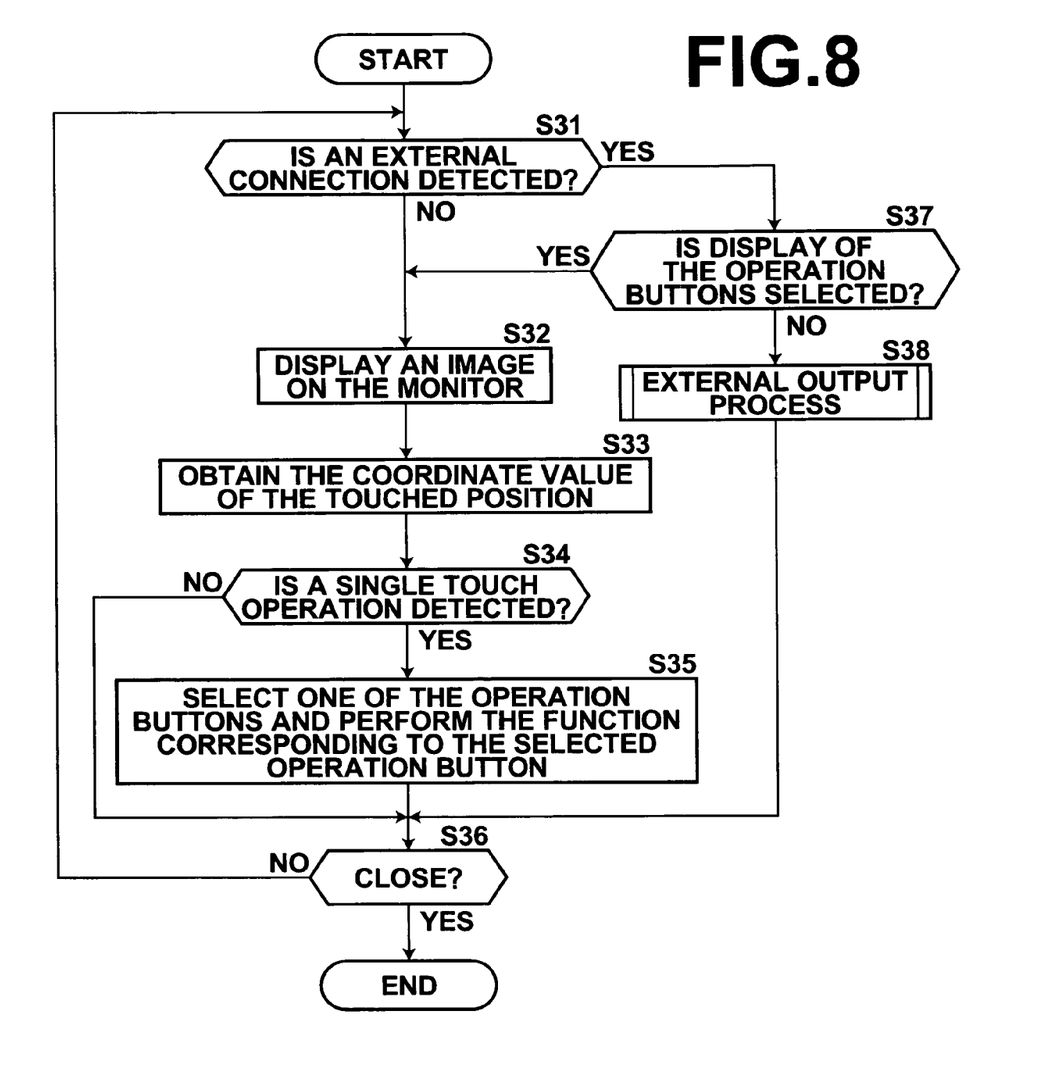
FIG. 8 is a flowchart illustrating a flow of a monitor display process according to the second embodiment.
Figure 10A:
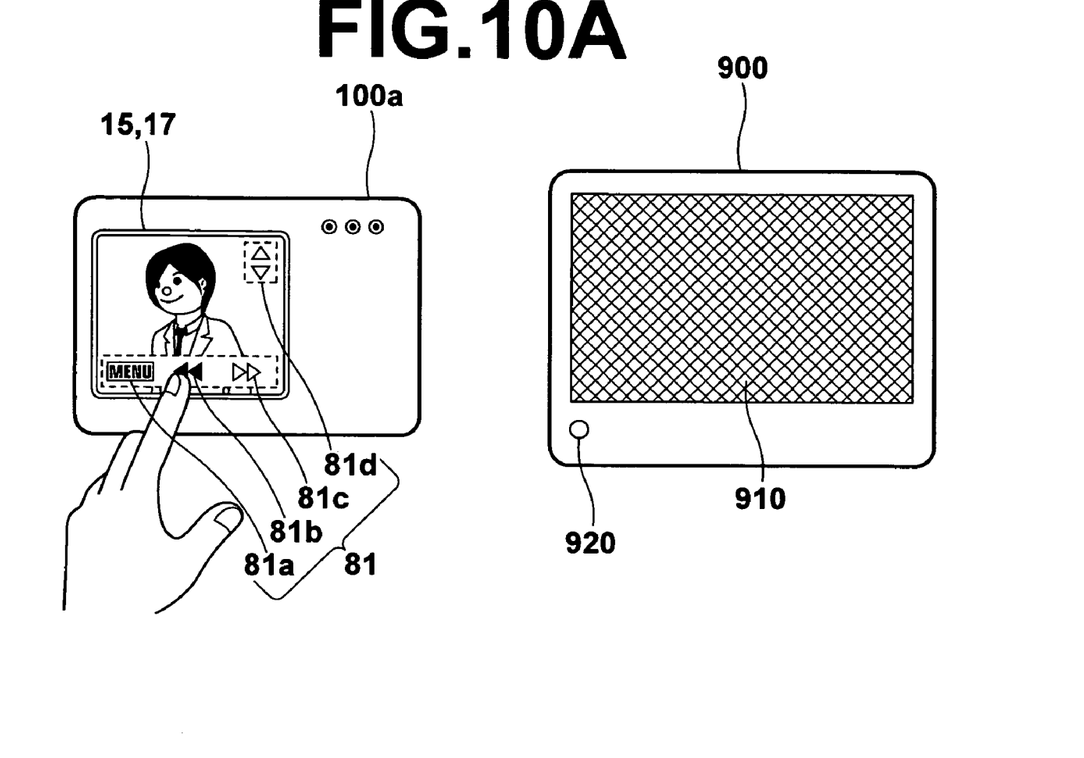
FIG. 10A is a drawing illustrating an example screenshot on the monitor according to the second embodiment.
Figure 10B:
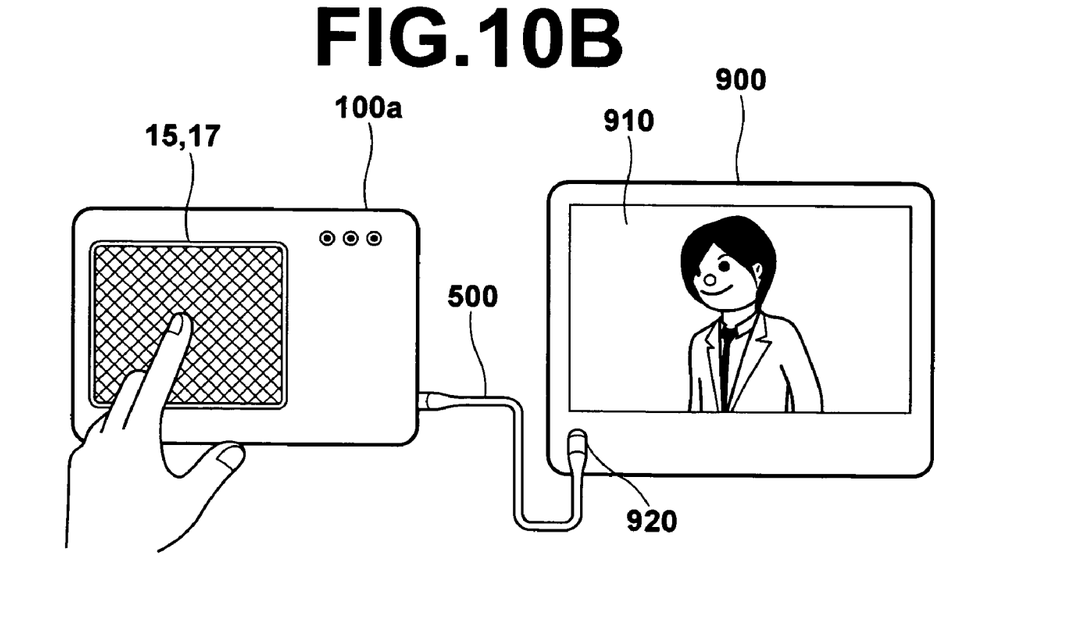
FIG. 10B is a drawing illustrating an example screenshot on the display device according to the second embodiment.

Next, a flow of monitor display process will be described with reference to a flowchart shown in FIG. 8 and example screenshots shown in FIGS. 10A, 10B. The monitor display process is performed by the CPU 11 that operates according to the monitor display program 310. First, if the connection between the output terminal 19 and the display 900 is not detected (step S31 is negative), the display signal for displaying an image on the monitor 15 with the operation buttons 81 superimposed thereon is outputted to the display control section 14 from the CPU 11. This causes the image to be displayed on the monitor 15 (step S32). Here, the image to be displayed may be an image based on image data recorded on the recording medium 400, or an image obtained by the imaging section 12. An example screenshot of the monitor 15 at this time is shown in FIG. 10A.

Then, when a touch operation is performed on the monitor 15, the coordinate value of the touched position is detected by the coordinate value detection section 17 and the coordinate value is outputted to the CPU 11 (step S33). The CPU 11 determines if the touch operation is a single touch operation. If the touch operation is determined not to be a single touch operation (step S34 is negative), the process moves to step S36. If the touch operation is determined to be a single touch operation (step S34 is positive), the CPU 11 performs the function corresponding to the operation button 81 displayed at the position on which the single touch operation is performed (step S35).

In the mean time, if the connection between the output terminal 19 and the display device 900 is detected by the detection section 20 (step S31 is positive), the CPU 11 outputs the display signal to the display control section 14 to display a comment, a button, or the like for prompting the user to determine whether the operation buttons are to be displayed. If the display of the operation buttons is selected by the user (step S37 is positive), the process moves to step S32. That is, although the output terminal 19 is connected to the display device 900, the image is not displayed on the display device 900 but on the monitor 15. If non-display of the operation buttons is selected (step S37 is negative), the CPU 11 moves the process to an external output process (step S38).

Figure 9:
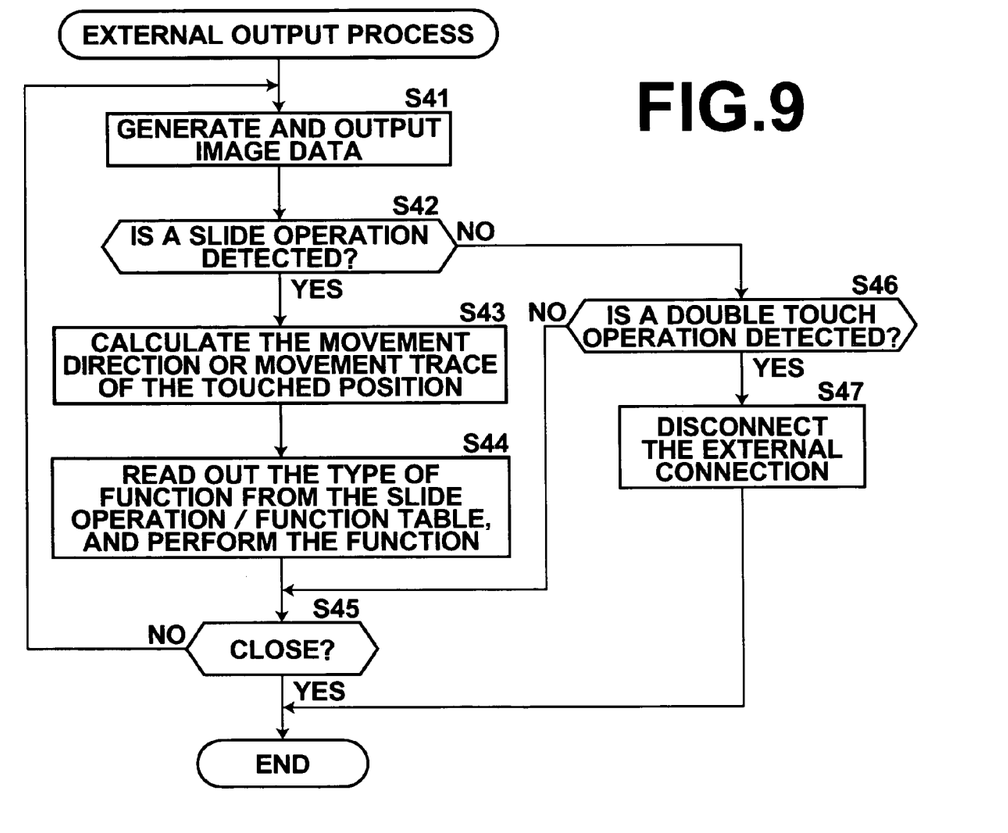
FIG. 9 is a flowchart illustrating a flow of an external output process according to the second embodiment.

FIG. 9 is a flowchart illustrating a flow of the external output process, which is performed by the CPU 11 that operates according to the external output program 320. First, the CPU 11 outputs the instruction signal to the display control section 14 to terminate the display on the monitor 15, and causes the image data generation section 18 to generate image data for displaying the image on the display device 900. The generated image data are outputted to the display device 900 from the output terminal 19, and the image is displayed on the screen 910 of the display device 900 according to the image data (step S41). An example screenshot of the screen 910 of the display device 900 at this time is shown in FIG. 10B.

As described above, when the digital camera 100a is not connected to the display device 900 (FIG. 10A), if a single touch operation is performed on an operation button 81 displayed on the monitor 15 using a finger, an input pen, or the like, the coordinate value of the touched position is detected by the coordinate value detection section 16, and the function corresponding to the selected operation button 81 is performed by the CPU 11. On the other hand, when the digital camera 100a is connected to the display device 900, the function of the touch panel 17 is switched to act as a pointing device (touchpad) for performing various functions.

More specifically, if a tap-in operation is performed on the touch panel 17 when the digital camera 100a is not connected to the display device 900, the coordinate values in the subsequent slide operations are detected sequentially, and the detected coordinate values are outputted to the CPU 11. The CPU 11 determines whether the touch operation is a slide operation, and if the touch operation is determined to be a slide operation (step S42 is positive), the sliding direction (movement direction) or the sliding trace (movement trace) is calculated by the CPU 11 based on the detected coordinate values (step S43). Then, the CPU 11 reads out the type of function from the slide operation/function table 330 according to the sliding direction or the sliding trace, and performs the function according to the type of function read out from the slide operation/function table 330 (step S44).

Then, if a double touch operation is performed on the touch panel 17 (step S46 is positive), the CPU 11 terminates the external output process, assuming that the output terminal 19 and the display device are not being connected. Then, returning to the internal display process, the CPU 11 outputs a display signal to the display control section 14 to display the image on the monitor 15 with the operation buttons 81 superimposed thereon. That is, the image display is switched to the monitor 15 from the screen 910.

As described above, when the digital camera 100a is used alone, one of the operation buttons 81 displayed on the monitor 15 is selected by performing a single touch operation on the monitor 15, and the function corresponding to the selected operation button 81 is performed. When the digital camera 100a is connected to the display device 900 through the output terminal 19, only the image is displayed on the screen 910 of the display device 900, and various functions are performed according to the directions or traces of the slide operations on the monitor 15. This causes no interruption on the image displayed on the screen 910, which may occur if the operation buttons are displayed on the screen 910, so that a clear view of the entire image may be obtained. Further, the digital camera, in which various functions are performed through the touch panel, and the monitor display thereof is terminated when outputting the image to an external device, may perform various functions through the touch panel. Thus, the digital camera employing the touch panel for inputting operational instructions may select/perform various functions with minimized number of operation buttons mounted thereon for the reduction in size and weight, while maintaining the operability when connected to an external device.

Figure 11A:
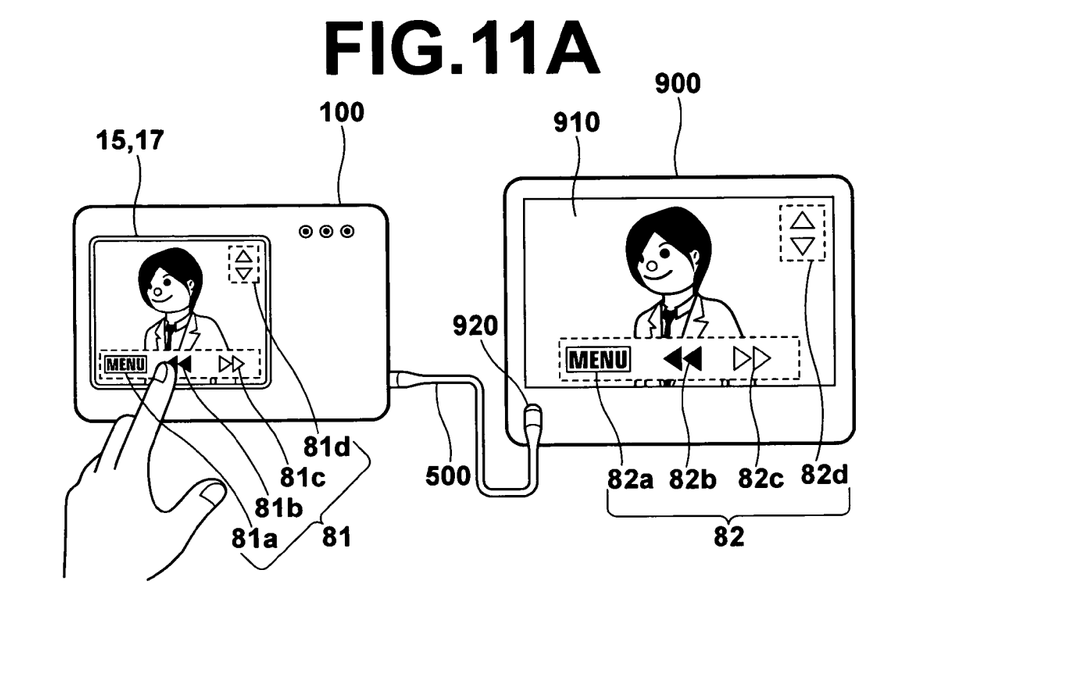
FIG. 11A is a drawing illustrating an example screenshot on the monitor according to a further embodiment.

In the first and second embodiments, description has been made in which the monitor display of the digital camera is terminated and the image display is switched to the display device when the digital camera is connected to the display device. Alternatively, a configuration may be adopted in which the image displayed on the monitor 15 is also displayed on the screen 910 at the same time as shown in FIG. 11A. Further, another configuration may be adopted in which the image is displayed on the monitor 15 with the operation buttons superimposed thereon, while only the image is displayed on the screen 910. Here, the image data generation section 18 may generate the image data using the display signals generated by the display control section 14 and output to the display device 900.

Figure 11B:
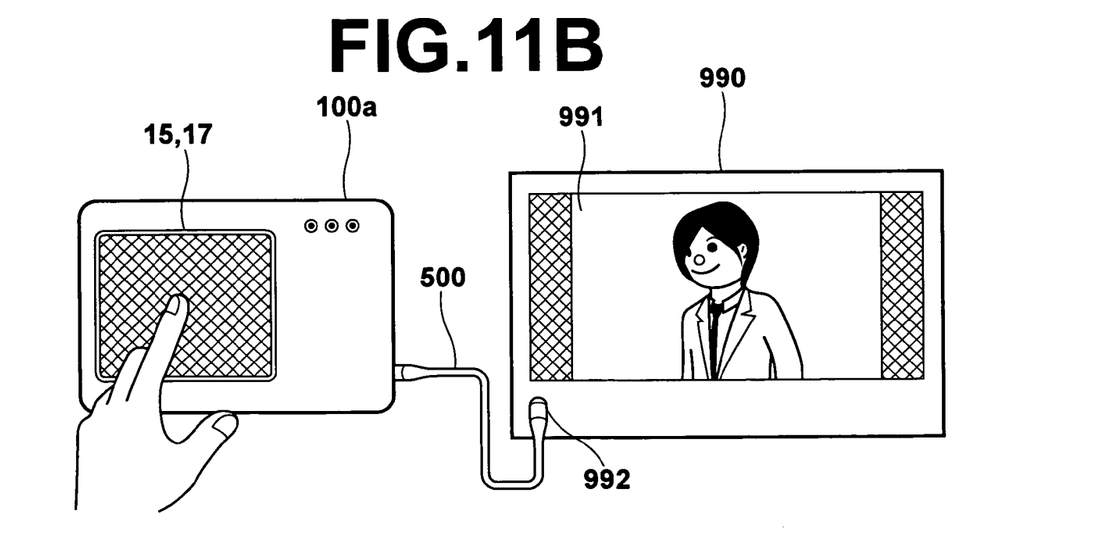
FIG. 11B is a drawing illustrating an example screenshot on the display device according to a further embodiment.

Here, it is customary that an NTSC display is used as the monitor 15. Accordingly, for connecting a display device 990 having a screen 991 which is different in resolution from the monitor 15 (e.g., Hi-Vision TV) to display the image on the screen 991 as shown in FIG. 11B, additional means for generating image data for the Hi-Vision TV is required. Thus, in this case, simultaneous image display on the monitor 15 and the screen 991 as shown in FIG. 11A is impracticable, since it requires complicated display control and increased power consumption. Accordingly, when displaying an image on the display device 990 having the screen 991 which is different in resolution from the monitor 15, it is desirable to terminate the image display on the monitor 15, and to display the image on the screen 991. FIG. 11B shows an example case in which only an image is displayed without operation buttons, but the image may be displayed on the screen 991 with the operation buttons superimposed thereon.

What is claimed is:

1. An image display apparatus comprising:
   a display screen having a touch panel function;
   a display control means for performing control for displaying an image on the display screen with operation buttons superimposed thereon;
   a position information detection means for detecting the position information of a touched position on the display screen;
   a selection means for selecting one of the operation buttons displayed on the display screen based on the detected position information;
   an image data generation means for generating image data for displaying the image on an external device with the operation buttons superimposed thereon; and
   an output terminal for outputting the generated image data to the external device, wherein:
the apparatus further comprises a switching detection means for detecting a display switching operation for switching the display of the image from the display screen to the external device; and if the display switching operation is detected by the switching detection means:
the display control means terminates the display control of the display screen and outputs the generated image data to the external device from the output terminal;
the position information detection means detects the position information of a touched position on the display screen; and
the select means selects one of the operation buttons displayed on the external device according to the detected position information.

2. The image display apparatus according to claim 1, wherein:
the apparatus further comprises a performing means for performing functions, each corresponding to each of the operation buttons; and
if a predetermined touch operation is performed while the display switching operation is detected by the switching detection means and one of the operation buttons is selected by the selection means, the performing means performs the function corresponding to the selected operation button.

3. An image display apparatus comprising:
a display screen having a touch panel function;
a display control means for performing control for displaying an image on the display screen with operation buttons superimposed thereon;
a position information detection means for detecting the position information of a touched position on the display screen;
an image data generation means for generating image data for displaying the image on an external device; and
an output terminal for outputting the generated image data to the external device,
wherein:
the apparatus further comprises:
a switching detection means for detecting a display switching operation for switching the display of the image from the display screen to the external device;
a movement direction/trace detection means for detecting the movement direction or the shape of the movement trace of the touched position from the position information detected by the position information detection means; and
a performing means for performing a predetermined function according to the movement direction or the shape of the movement trace of the touched position on the display screen, and
if the display switching operation is detected by the switching detection means:
the display control means terminates the display control of the display screen and outputs the generated image data to the external device from the output terminal;
the movement direction/trace detection means detects the movement direction or the shape of the movement trace of a touched position on the display screen, and
the performing means performs the function corresponding to the detected movement direction or the shape of the movement trace of the touched position.

4. An image display method comprising the steps of:
displaying an image on a display screen having a touch panel function with operation buttons superimposed thereon;
detecting the position information of a touched position on the display screen;
selecting one of the operation buttons displayed on the display screen based on the detected position information;
generating image data for displaying the image on an external device with the operation buttons superimposed thereon; and
outputting the generated image data to the external device from an output terminal,
wherein:
the method further comprises the step of detecting a display switching operation for switching the display of the image from the display screen to the external device; and
if the display switching operation is detected,
the display control of the display screen is terminated and the generated image data are outputted to the external device from the output terminal;
the position information of a touched position on the display screen is detected; and
one of the operation buttons displayed on the external device is selected according to the detected position information.

5. An image display method comprising the steps of:
displaying an image on a display screen having a touch panel function with operation buttons superimposed thereon;
detecting the position information of a touched position on the display screen; and
generating image data for displaying the image on an external device; and
outputting the generated image data to the external device from an output terminal,
wherein:
the method further comprises the step of detecting a display switching operation for switching the display of the image from the display screen to the external device; and
if the display switching operation is detected:
the display control of the display screen is terminated and the generated image data are outputted to the external device from the output terminal;
the movement direction or the shape of the movement trace of the touched position on the display screen is detected from the movement information of a touched position; and
the function corresponding to the detected movement direction or the shape of the movement trace of the touched position is performed.

* * * * *